(12) United States Patent
Bargeron et al.

(10) Patent No.: US 7,218,783 B2
(45) Date of Patent: May 15, 2007

(54) DIGITAL INK ANNOTATION PROCESS AND SYSTEM FOR RECOGNIZING, ANCHORING AND REFLOWING DIGITAL INK ANNOTATIONS

(75) Inventors: David M. Bargeron, Seattle, WA (US); Tomer Moscovich, Providence, RI (US); Michael Shilman, Seattle, WA (US); Zile Wei, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 727 days.

(21) Appl. No.: 10/460,999

(22) Filed: Jun. 13, 2003

(65) Prior Publication Data

US 2004/0252888 A1   Dec. 16, 2004

(51) Int. Cl.
*G06K 9/00* (2006.01)
(52) U.S. Cl. .................. 382/188; 382/224; 382/309; 715/512; 715/517
(58) Field of Classification Search .............. 382/188, 382/181, 185, 186, 187, 189, 202, 225, 226, 382/224, 309; 715/512, 513, 517; 707/101, 707/500, 502
See application file for complete search history.

(56) References Cited

U.S. PATENT DOCUMENTS 6,333,994 B1 * 12/2001 Perrone et al. ............. 382/186
6,687,876 B1 * 2/2004 Schilit et al. ............... 715/512
7,062,498 B2 * 6/2006 Al-Kofahi et al. .......... 707/101

OTHER PUBLICATIONS

Brush, A.J., Bargeron, D., Gupta, A. and Cadiz, J.J., "Robust Annotation Positioning in Digital Documents", in *Proceedings of CHI 2001*, pp. 285-292, ACM Press, 2001.
Golovchinsky, G. and Denoue, L., "Moving Markup: Repositioning Freeform Annotations", in *Proceedings of UIST 2002*, ACM Press, 2002.
Marshall, C.C. and Brush, A.J., "From Personal to Shared Annotations", in *Proceedings of CHI 2002*, pp. 812-813, ACM Press, 2002.
Schilit, B.N., Golovchinsky, G. and Price, M.N., "Beyond paper: supporting active reading with free-form digital ink annotations", in *Proceedings of CHI 1998*, pp. 249-256, ACM Press, 1998.

* cited by examiner

*Primary Examiner*—Sheela Chawman
(74) *Attorney, Agent, or Firm*—Lyon & Harr, L.L.P.; Craig S. Fischer

(57) ABSTRACT

A digital ink annotation process and system for processing digital documents and digital ink annotations therein. The process and system maintain an annotation's position within a document such that the original intent and meaning of the annotation is preserved. This is true even if the document is edited, resized, displayed on a different device or otherwise modified. The digital ink annotation process includes automatic and manual grouping of digital ink strokes within a document to define digital ink annotations, classifying the annotations according to annotation type, and anchoring the annotations to appropriate regions or positions in a document. The process further includes reflowing the annotations in a new document layout such that the annotations conform and adapt to the new layout while preserving the original intents and meanings of the annotations. A digital ink annotation system includes a classification module, an anchoring module, a reflow module and a clean-up module to implement the digital ink annotation process.

16 Claims, 17 Drawing Sheets

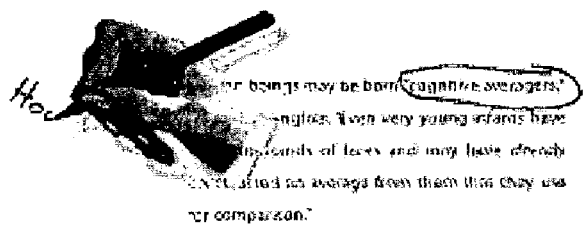
FIG. 8A
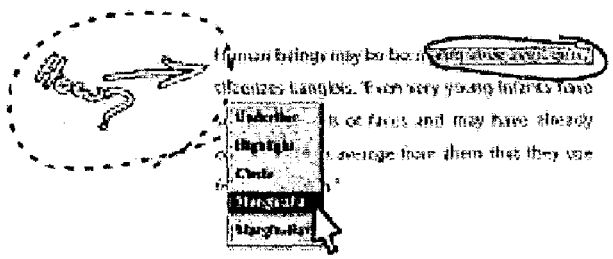
FIG. 8B
FIG. 8C

(A) User Annotation

She's cute, no question. Symmetrical features, flawless skin, looks to be 22 years old. Entering any bar, a woman lucky enough to have this face would turn enough heads to stir a breeze. But when Victor

(B) Reflowed Annotation

She's cute, no question. Symmetrical features, flawless skin, looks to be 22 years old. Entering any bar, a woman lucky enough to have this face would turn enough heads to stir a breeze. But

(C) Cleaned Annotation

She's cute, no question. Symmetrical features, flawless skin, looks to be 22 years old. Entering any bar, a woman lucky enough to have this face would turn enough heads to stir a breeze. But

FIG. 11A

(A) User Annotation

She's cute, no question. Symmetrical features, flawless skin, looks to be 22 years old. Entering any bar, a woman lucky enough to have this face would turn enough heads to stir a breeze. But when Victor

(B) Reflowed Annotation

She's cute, no question. Symmetrical features, flawless skin, looks to be 22 years old. Entering any bar, a woman lucky enough to have this face would turn enough heads to stir a breeze. But

(C) Cleaned Annotation

She's cute, no question. Symmetrical features, flawless skin, looks to be 22 years old. Entering any bar, a woman lucky enough to have this face would turn enough heads to stir a breeze. But

FIG. 11B

(A) User Annotation

She's cute, no question. Symmetrical features, flawless skin, looks to be 22 years old. Entering any bar, a woman lucky enough to have this face would turn enough heads to stir a breeze. But when Victor Johnston points and clicks, the face on his computer

(B) Reflowed Annotation

She's cute, no question. Symmetrical features, flawless skin, looks to be 22 years old. Entering any bar, a woman lucky enough to have this face would turn enough heads to stir a breeze. But

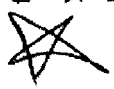

(C) Cleaned Annotation

She's cute, no question. Symmetrical features, flawless skin, looks to be 22 years old. Entering any bar, a woman lucky enough to have this face would turn enough heads to stir a breeze. But

FIG. 11C

(A) User Annotation

She's cute, no question. Symmetrical features, flawless skin, looks to be 22 years old. Entering any bar, a woman lucky enough to have this face would turn enough heads to stir a breeze. But when Victor

(B) Reflowed Annotation

She's cute, no question. Symmetrical features, flawless skin, looks to be 22 years old. Entering any bar, a woman lucky enough to have this face would turn enough heads to stir a breeze. But

(C) Cleaned Annotation

She's cute, no question. Symmetrical features, flawless skin, looks to be 22 years old. Entering any bar, a woman lucky enough to have this face would turn enough heads to stir a breeze. But

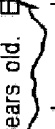

FIG. 11D

(A) User Annotation

She's cute, no question. Symmetrical features, flawless skin, looks to be 22 years old. Entering any bar, a woman lucky enough to have this face would turn enough heads to stir a breeze. But when Victor Johnston points and clicks, the face on his computer screen morphs into what a mesmerized physicist might call a

(B) Reflowed Annotation

She's cute, no question. Symmetrical features, flawless skin, looks to be 22 years old. Entering any bar, a woman lucky enough to have this face would turn enough heads to stir a breeze. But when Victor Johnston points and clicks, the face on his computer screen morphs into what a mesmerized physicist might call a

(C) Cleaned Annotation

She's cute, no question. Symmetrical features, flawless skin, looks to be 22 years old. Entering any bar, a woman lucky enough to have this face would turn enough heads to stir a breeze. But when Victor Johnston points and clicks, the face on his computer screen morphs into what a mesmerized physicist might call a

FIG. 11E

(A) User Annotation

She's cute, no question. Symmetrical features, flawless skin, looks to be 22 years old. Entering any bar, a woman lucky enough to have this face would turn enough heads to stir a breeze. But when Victor

(B) Reflowed Annotation

She's cute, no question. Symmetrical features, flawless skin, looks to be 22 years old. Entering any bar, a woman lucky enough to have this face would turn enough heads to stir a breeze. But

(C) Cleaned Annotation

She's cute, no question. Symmetrical features, flawless skin, looks to be 22 years old. Entering any bar, a woman lucky enough to have this face would turn enough heads to stir a breeze. But

FIG. 11F

(A) User Annotation

She's cute, no question. Symmetrical features, flawless skin, looks to be 22 years old. Entering any bar, a woman lucky enough to have this face would turn enough heads to stir a breeze. But when Victor Johnston points and clicks, the face on his computer screen morphs into what a mesmerized physicist might call a discontinuous state of superheated, crystallized beauty. "You can see it. It's just so

(B) Reflowed Annotation

She's cute, no question. Symmetrical features, flawless skin, looks to be 22 years old. Entering any bar, a woman lucky enough to have this face would turn enough heads to stir a breeze. But when Victor Johnston points and clicks, the face on his computer screen morphs into what a mesmerized physicist might call a discontinuous state of superheated, crystallized beauty. "You

(C) Cleaned Annotation

She's cute, no question. Symmetrical features, flawless skin, looks to be 22 years old. Entering any bar, a woman lucky enough to have this face would turn enough heads to stir a breeze. But when Victor Johnston points and clicks, the face on his computer screen morphs into what a mesmerized physicist might call a discontinuous state of superheated, crystallized beauty. "You

FIG. 11G

DIGITAL INK ANNOTATION PROCESS AND SYSTEM FOR RECOGNIZING, ANCHORING AND REFLOWING DIGITAL INK ANNOTATIONS

TECHNICAL FIELD

The present invention relates in general to digital document processing and more particularly to a process and system for processing freeform digital ink annotations made on a digital document such that when the digital document's layout is modified (either because it is edited or displayed on different displays), the annotations' layout adapts accordingly.

BACKGROUND OF THE INVENTION

Annotating paper documents with a pen is a familiar and indispensable activity across a wide variety of business and educational environments. Annotating a document is the act of "marking up" or placing critical and explanatory notes and remarks on the document. These notes and remarks may by textual, graphical, or both.

As pen-based computing devices such as pen computers, Tablet PCs and personal digital assistants (PDAs) become increasingly popular among consumers, the ability to annotate digital documents becomes highly useful and important. Pen-based computing devices utilize an electronic pen (called a stylus) instead of a keyboard for input. Pens are used for input because in many situations the computing devices are too small to incorporate a keyboard. In addition, there are numerous situations where a pen together with a notepad is more convenient for the user that a keyboard. These pen-based computing devices generally have special operating systems that support handwriting recognition, which allows a user to interface with the device by writing on a screen or on a tablet instead of typing on a keyboard.

Despite the availability and usefulness of pen-based computing devices, when it comes to reading and annotating documents the majority of people still prefer pen and paper. One key reason is that pen and paper offer a reader an easy way for the reader to sketch unstructured or freeform notes and drawings in response to document content.

Notwithstanding the advantages offered by paper documents during the annotation process, digital documents and annotations tend to be more flexible than their paper counterparts. For example, digital documents can be more easily edited and adapted to conform to different display sizes than paper documents. In addition, while annotated paper documents often end up in the trash bin, digital annotations can persist throughout the lifetime of a digital document. Moreover, digital documents and annotations can be more easily filtered, organized, and shared.

Because of this flexibility, digital documents can be used in diverse environments. For example, a single digital document may be read is several different formats, displayed on a variety of devices, and presented within a variety of window sizes. The digital document may be edited, combined with other documents, and may even dynamically adapt its contents. Thus, unlike a paper document, a digital document generally does not have a permanent layout.

This lack of a permanent layout presents a significant technological challenge when considering freeform digital ink annotations on a digital document. Each time a digital document adapts to a new layout, for instance, the associated annotations must also be adapted. In other words, when a digital document is edited or displayed on different devices or in different window sizes, the layout of the digital document changes to adapt to the new situation. Any "digital ink" annotations made on the digital document must likewise be adapted (or "reflowed") to the new layout conditions.

In order to support reflowing freeform digital ink annotations, three problems must be solved: First, the annotations that the reader is creating must be recognized and classified as one of several types of annotations (e.g. "underline," "circle," "margin comment," etc.). Next, each annotation must be anchored to the particular place in the document where the annotation belongs. Finally, if the underlying document's layout changes at some point in the future, existing annotations on the document must be properly reflowed so they continue to agree with the reader's original intent.

Historically, much of the research and development effort associated with digital ink has centered on handwriting recognition. The digital ink annotation process and system disclosed herein, however, does not use handwriting recognition. This is because it is possible to reflow digital ink annotations simply by knowing that they are or are not handwriting (which is a high-level classification task), without knowing specifically what they say (which is a fine-grained recognition task).

More recently, several approaches have used ink shape recognition to support a variety of sketch-based interfaces. These approaches have used heuristics or machine learning techniques to recognize a set of shapes or gestures. However, when considering their use for support of digital ink annotation, one shortcoming with these approaches is that they do not anchor ink strokes with an independent context such as an underlying document, and thus cannot modify the user's ink in response to changes in this context.

There is at least one approach that applies shape recognition to digital ink annotations, then use this to adapt freeform ink annotations to constrained changes in viewing conditions (such as changing the font size in a document). This approach originally tried simple heuristics to perform recognition, however this was found to be insufficient. Subsequently, this approach relied on machine learning techniques for recognition, and "super-local" anchoring for associating parts of ink strokes with individual context features. One problem with this approach has been that it does not include manual classification. Manual classification should be included in a system such that the user is allowed to make manual selections when the automatic classification, anchoring, or reflow fails or is not feasible. Also, "super-local" anchoring (e.g. where parts of individual ink strokes are separately anchored to document context features) is appropriate for adapting annotations to the kind of constrained changes in viewing conditions that this approach was concerned with, however, it is insufficient for support of fully unconstrained reflow of digital ink annotations, since the transformation of an annotation must take into account all ink strokes involved in the annotation and all features in an annotation's anchor context.

Therefore, there exists a need for a document processing system and method that overcomes the aforementioned problems and limitations. In particular, a system and method are needed that preserve the intent and visual meaning of digital ink annotations whenever an original document is modified.

SUMMARY OF THE INVENTION

The invention disclosed herein includes a digital ink annotation process and system for preserving the intent and meaning of digital ink annotations in an original document whenever the original document takes on a new layout as a result of being edited or displayed on a different display device or in a different window size. In general, the process and system include three broad aspects. First, as a user in marking up a document, their digital ink strokes are grouped to define an annotation and the annotation is classified as one of several annotation "types." These annotation "types" include underlines, highlights, margin brackets, circles, marginalia, and callout or connector annotations. Second, each annotation must be anchored to its surrounding context in the document. Finally, when the layout of the underlying or original document changes, each annotation must be transformed to agree with and conform to the new layout of its context. This final step is called "reflowing" the document and annotations. These three aspects allow the digital ink annotation system and process disclosed herein to process digital ink annotations on a digital document such that the annotations "keep up" with where they belong in the document. This is true even if the document is edited, resized, displayed on a different device or otherwise modified.

In general, the digital ink annotation system includes several components to process the digital document and annotations while ensuring the correct positioning of the annotations in a reflowed digital document. The system includes a classification module, an anchoring module, a reflow module, and a clean-up module. The classification module groups digital ink strokes to define an annotation and then classifies that annotation. The anchoring module abstracts a 2D layout model of the document and uses robust anchoring techniques to connect (or "anchor") the annotation to a region in the digital document that the annotation is associated with. The reflow module uses the classification and anchor context information associated with each annotation to reflow or rerender the annotation based on changes to the digital document. The reflow module insures preservation of the user's original intent and meaning whenever the digital document is modified. The clean-up module is an optional component that can be used to eliminate the user's original freehand annotations and redraw formalized "cleaned-up" versions of the annotations. The clean-up module stylizes each annotation by initially determining its classification. Then, based on classification clean-up rules, the freehand annotation is converted to a stylized annotation.

The classification module encapsulates the process by which proximate ink strokes are grouped and classified on a digital document to define a digital ink annotation. It does this by extracting and examining features of the digital ink strokes to determine an initial grouping and classification, then refining this grouping and classification based on an hypothetical anchor context for the annotation in the digital document. Based on the refined grouping and classification result, a better estimate for the anchor context is identified, and so on. After iterating back and forth between grouping and classification, and anchor context identification, the system converges to a grouping and classification result with associated confidence and anchor context. If the grouping and classification process converges to a low-confidence estimate for a particular annotation's classification and/or anchor context (e.g. below a certain threshold), then it is determined that manual grouping should be used, and the user is consulted.

Grouping of ink strokes may be based on a temporal order of strokes, spatial arrangement, or a combination of both. The digital ink annotation process automatically recognizes at least six types or classifications of digital ink annotations: underline annotations, highlight annotations, marginalia annotations, circle annotations, margin bracket annotations, and callout or connector annotations Each of these classifications has distinct characteristics which determine what type of anchor context to expect, and what kind of reflow transformation will be performed.

Once the ink strokes of the annotation are grouped, the annotation is classified, and a likely anchor context has been identified, the anchoring module anchors the annotation to its intended context. In other words, the annotation must be logically anchored to a region or position in the document where it belongs such that that same region or position in the document can be recovered even if the document's layout, format, or content changes. The anchoring process defines anchoring rules for each classification of digital ink annotation, applies these anchoring rules to each digital ink annotation, and generates a logical anchor for each annotation. In addition, the anchoring process determines the validity of the anchor based on the context of the annotation in the document, and ascertains whether user interaction is desired based on the validity of anchor. For instance, if the context is determined to be missing as the result of an edit, the annotation's anchor is determined to be invalid, and the user is consulted as to what to do with the orphaned annotation.

If the layout of the document to which the annotation is anchored subsequently changes, but the annotation's anchor is not invalidated by the change, the reflow module rerenders the annotation based on its classification and its anchor context. The reflow module determines the new layout of the digital document, then transforms and rerenders the annotation to conform to the new layout without losing any meaning or intent of the annotation.

In addition, the digital ink annotation system includes a user feedback module. The user feedback module provides an interface whereby the user can interact with the system to improve the accuracy and efficacy of the system. The feedback user interface is in communication with the classification module, the anchoring module, the reflow module, and the clean-up module. A user may also override the automatic features of the system at any time and manually perform a task (such as grouping or classification).

BRIEF DESCRIPTION OF THE DRAWINGS

The present invention can be further understood by reference to the following description and attached drawings that illustrate aspects of the invention. Other features and advantages will be apparent from the subsequent detailed description of the invention, taken in conjunction with the accompanying drawings, which illustrate, by way of example, the principles of the present invention.

Referring now to the drawings in which like reference numbers represent corresponding parts throughout:

FIG. 8A illustrates a user annotating a digital document by creating digital ink strokes on the document.

FIG. 8B illustrates the manual grouping and classification of the annotation.

FIG. 8C illustrates the reflowing of the document and annotation using the digital ink annotation process.

FIG. 11A illustrates the digital ink annotation processing of an underline annotation.

FIG. 11B illustrates the digital ink annotation processing of a highlight annotation.

FIG. 11C illustrates the digital ink annotation processing of a marginalia annotation.

FIG. 11D illustrates the digital ink annotation processing of an inline circle annotation.

FIG. 11E illustrates the digital ink annotation processing of a region circle annotation.

FIG. 11F illustrates the digital ink annotation processing of a margin bracket annotation.

FIG. 11G illustrates the digital ink annotation processing of a connector annotation.

DETAILED DESCRIPTION OF THE INVENTION

Figure 1:
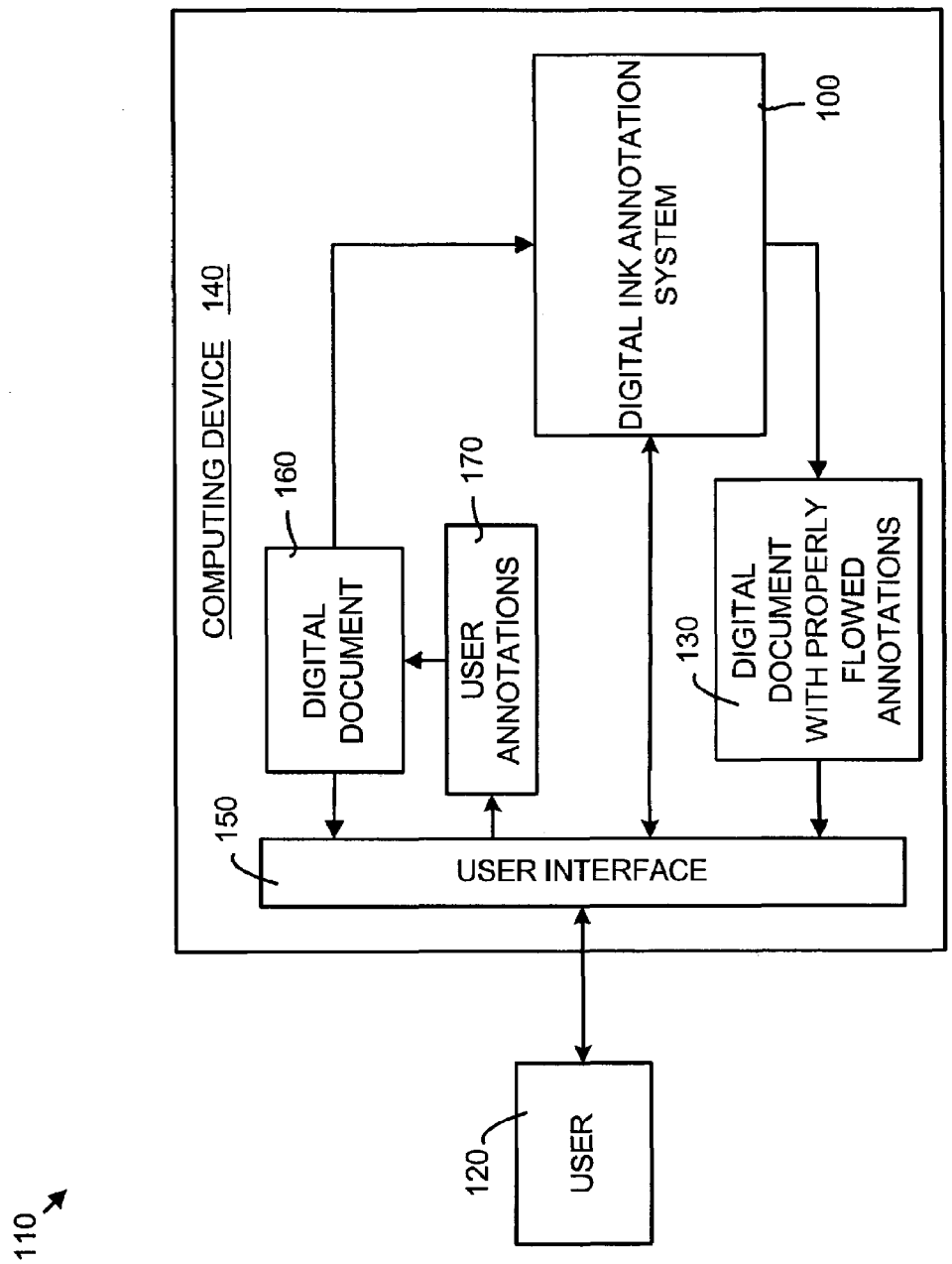
FIG. 1 is a block diagram illustrating an annotation environment incorporating the digital ink annotation system and process disclosed herein.

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

People have been making pen and ink annotations on paper documents for literally hundreds of years. In general, an annotation is a note (either textual or graphical) or a symbol added to a document for comment, explanation or correction. Annotations are a natural and intuitive means of recording one's thoughts and impressions about a document. In addition, annotations can be used to indicate errors in a document that need correction.

Current technology allows a user to create digital ink annotations on a "frozen" digital document similar to pen annotations on a paper document. For example, a Table PC user can make digital ink annotations on an image of a document (such as a Tagged Image File Format (TIFF) image of a document) using a stylus to write on a screen. The user has all the flexibility afforded him on paper, however he also suffers all the limitations. True "dynamic" digital documents—such as word processing documents or HTML web pages—are much more flexible and fluid than their paper document (or document image) counterparts. For example, dynamic digital documents can be easily resized within a window or reformatted for display on a larger or smaller display device. There are currently no techniques that support the adaptation of annotations on these more flexible dynamic digital documents when the documents' layouts change.

The digital ink annotation system and process disclosed herein supports digital ink annotations on a dynamic digital document such that annotations "keep up" with where they belong in the document when and if the document's layout changes. This is true even if the document is edited, resized, displayed on a different device, or otherwise modified. By way of example, suppose that a user underlines a single-line sentence on a web page using a Tablet PC. If the web page is subsequently reformatted for display on the smaller screen of a PDA, the underline may have to be split across multiple document lines. This insures that all parts of the sentence remain underlined and the user's original intent is preserved.

II. General Overview

The digital ink annotation system and process represents an important extension of the traditional pen and paper annotation paradigm, from static documents to dynamic documents. There are at least three primary aspects to the digital ink annotation system and process. A first aspect is that digital ink annotations are automatically or manually recognized and classified. A second aspect is that the classified annotations then are anchored to elements (text, images, tables, etc) within the document. This insures that even if the document is modified, the annotations on it will be placed in the document's new layout such that the user's original intent and meaning is preserved. A third aspect is a technique for modifying ink strokes such that the digital ink annotations are appropriately displayed after a document has been reflowed, modified, or both.

FIG. 1 is a block diagram illustrating an annotation environment incorporating the digital ink annotation system and process disclosed herein. In general, the digital ink annotation system 100 is implemented in the annotation environment 110 such that a user 120 can produce a digital document with properly flowed annotations 130. The digital ink annotation system 100 generally resides on a computing device 140. As discussed in section VII below, this computing device 140 typically contains a processor (not shown) for executing the digital ink annotation process in the form of computer-executable instructions.

In particular, referring to FIG. 1, the user 120 interacts with the computing device 140 by way of a user interface 150. The user interface 150 allows the user 120 to view and interact with a digital document 160. In addition, the user 120 is able to add freeform digital ink user annotations 170 to the digital document 160 using a stylus or pen input device. The digital document 160 and associated user annotations 170 are sent to the digital ink annotation system 100 for processing. As explained in detail below, the digital ink annotation system 100 processes the digital document 160 and user annotations 170 and outputs the digital document with properly flowed annotations 130. Thereafter, the digital document with properly flowed annotations 130 is treated as if it were the digital document 160: The user may add further annotations (or otherwise interact with the document, such as deleting or moving existing annotations, editing the document contents, etc), and these commands are referred to the digital ink annotation system 100 for subsequent processing. In addition, user 120 can also interact directly with the digital ink annotation system 100 through the user interface 150, for instance to control annotation system parameters and preferences.

III. System Details

The digital ink annotation system 100 includes several components. These components allow the system 100 to process the digital document 160 and the user annotations 170 and insure the correct positioning of the user annotations 170 in a reflowed digital document.

Figure 2A:
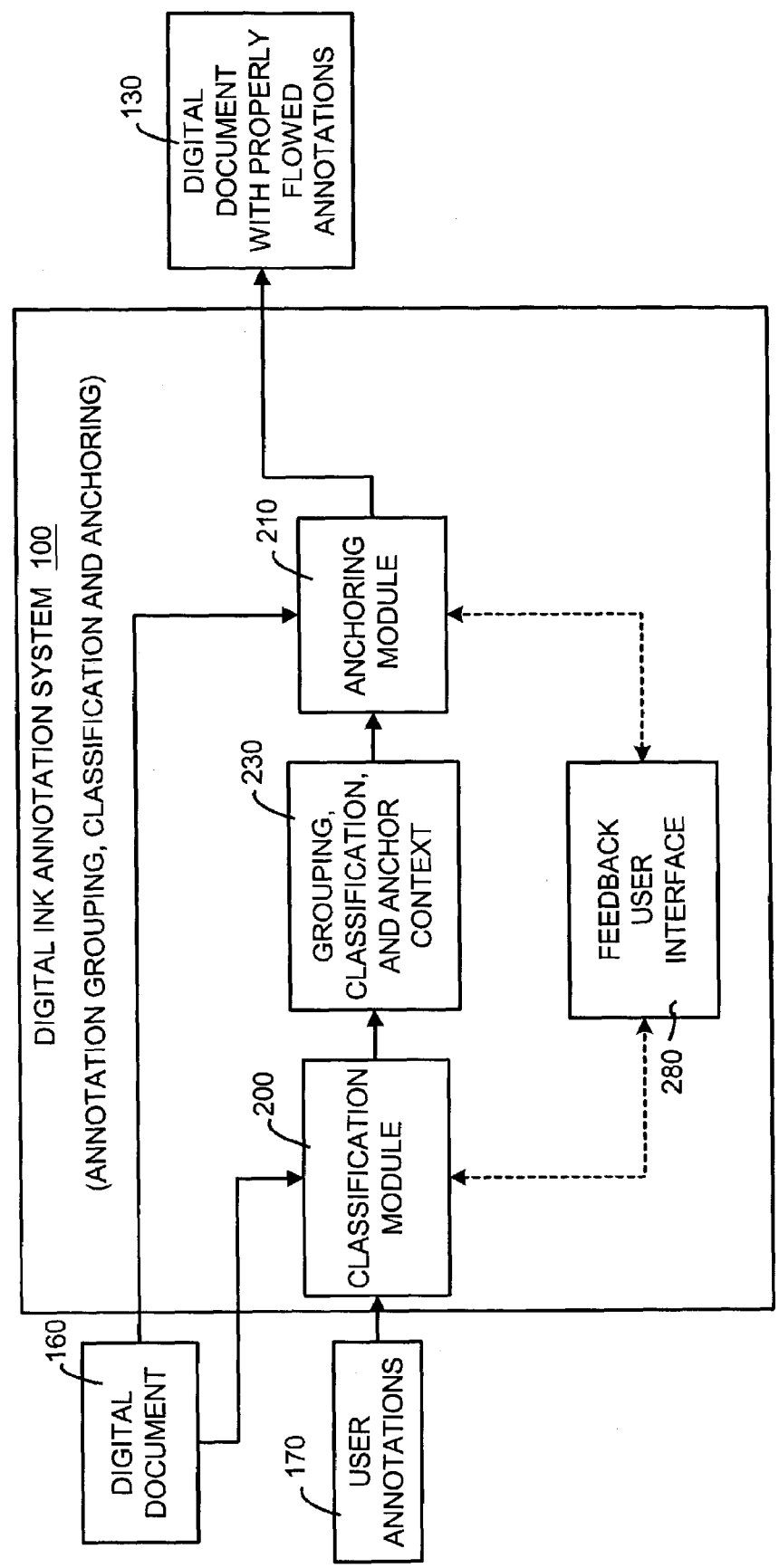
FIG. 2A is a block diagram illustrating the details of the an exemplary implementation of the digital ink annotation system shown in FIG. 1 during annotation grouping, classification and anchoring.
Figure 2B:
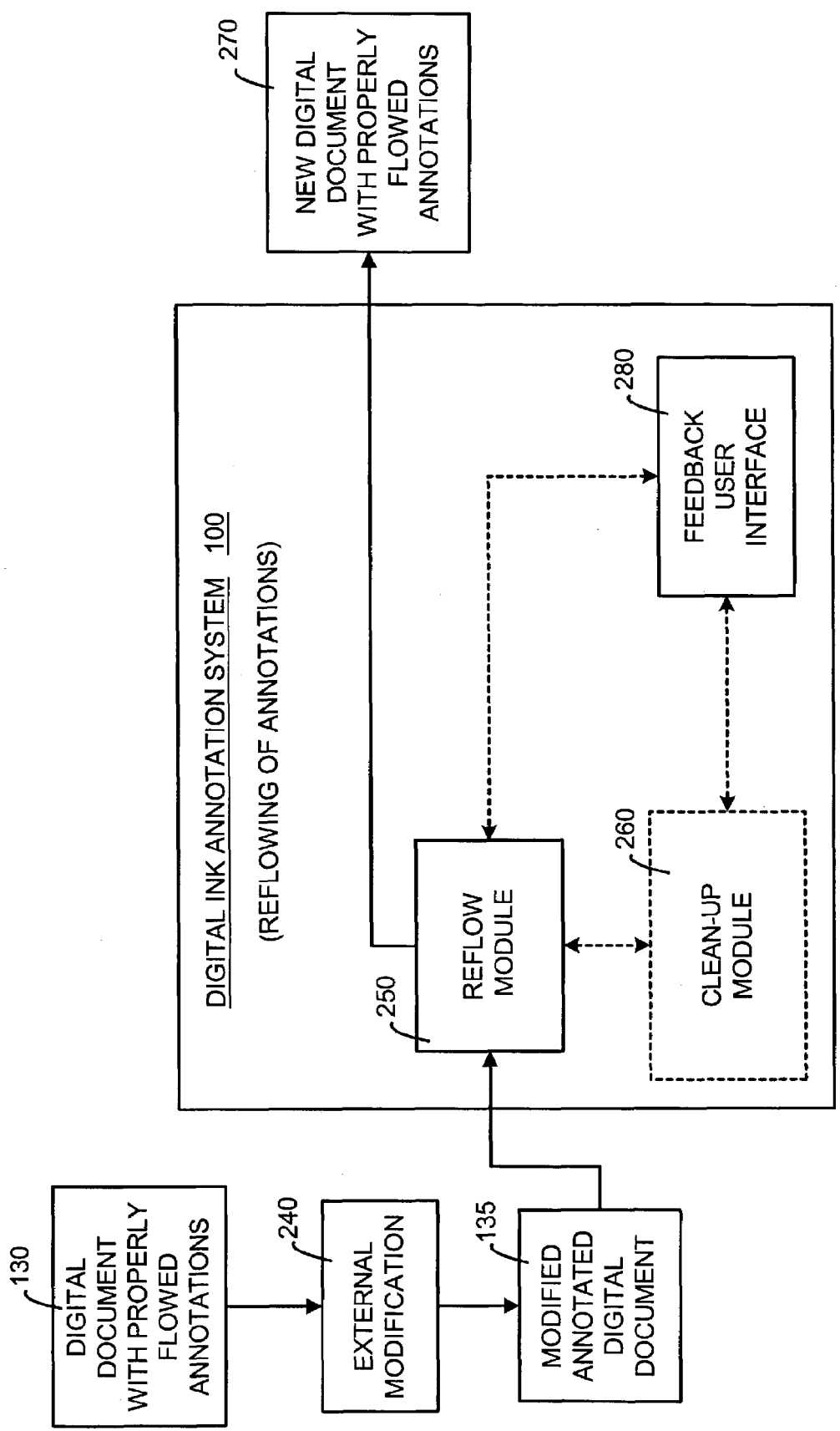
FIG. 2B is a block diagram illustrating the details of the an exemplary implementation of the digital ink annotation system 100 shown in FIG. 1 during reflowing of annotations.

FIGS. 2A and 2B are block diagrams illustrating the details of an exemplary implementation of the digital ink annotation system 100 shown in FIG. 1. In general, as the user is adding new annotations to the document, the digital ink annotation system 100 processes the digital document 160 and associated user annotations 170 to produce the digital document with properly flowed annotations 130. The digital document with properly flowed annotations 130 may subsequently be modified outside the scope of the digital ink annotation system 100 by some external modification process (for instance, the document may be edited, or it may be displayed in a different window size), which results in a modified annotated digital document 135. In this case, the modified annotated digital document 135 is fed as input back into the digital ink annotation system 100 so that its annotations may be properly reflowed to keep up with where they belong in the document's new layout, and a new digital document with properly flowed annotations 130 is produced.

FIG. 2A is a block diagram illustrating the details of an exemplary implementation of the digital ink annotation system 100 shown in FIG. 1 during annotation grouping, classification and anchoring. In particular, the digital ink annotation system 100 shown in FIG. 2A includes a classification module 200 and an anchoring module 210, The classification module 200 takes as input the digital ink strokes comprising the user annotations 170, along with the digital document 160, and groups the ink strokes together to define grouping, classification, and anchor context combinations 230 for each annotation.

The anchoring module 210 uses robust anchoring techniques to connect (or "anchor") the ink stroke groupings emitted by the classification module 200 to their associated anchor context (e.g. to the region in the digital document that the group most likely is associated with). The anchoring module 210 takes as input the grouping, classification, and anchor context combinations 230 emitted by the classification module 200, and the digital document 160. For each grouping, the anchoring module 210 extracts anchor features from the digital document 160 that describe the anchor context, and then associates these features with the grouping. After it has processed all groupings, the anchoring module 210 outputs the digital document with properly flowed annotations 130.

As shown in FIG. 2B, the digital document with properly flowed annotations 130 may subsequently be modified by some external modification process 240 outside the scope of the digital ink annotation system 100 to produce a modified annotated digital document 135. The external modification process 240 may include any changes—such as edits to the document contents, or display on a different device or in a different window size—which produce changes in the document's 2D layout, but which neglect to appropriately modify the annotations. As a result, the annotations may appear to be incorrect, and thus must be transformed to agree with the document's new layout in order to appear to "keep up" with where they belong.

FIG. 2B is a block diagram illustrating the details of an exemplary implementation of the digital ink annotation system 100 shown in FIG. 1 during reflowing of annotations. The digital ink annotation system 100 includes a reflow module 250 and a clean-up module 260. The reflow module 250 takes as input the modified annotated digital document 135 and produces as output a new digital document with properly flowed annotations 270. That is, the reflow module 250 transforms and rerenders the annotations that are present on the modified annotated digital document 135 to adapt to the document's new layout. It does this by examining each individual annotation's logical anchor features to discover where its anchor context has moved to in the document's new layout. Each different type or class of annotation (underline, circle, margin comment, etc) has its own set of rules governing how that type of annotation is to be reflowed. Once the reflow module 250 determines where the annotation's anchor context has gone, it chooses the appropriate set of reflow rules to use for the annotation's type or classification, and transforms the annotation. This manner of reflow insures that the user's original intent and meaning is preserved whenever the digital document with properly flowed annotations 130 changes.

The clean-up module 260 is an optional component (as indicated by the dashed box) that replaces the user's original freehand ink annotations with formalized "cleaned-up" versions of the annotations. As explained below, some annotations are better left preserved as the user drew them, so they pass through the clean-up module 260 without being replaced. The clean-up module 260 stylizes each annotation by initially determining its type or classification. Then, based on the set of clean-up rules for the annotation's particular type, the annotation is converted to a stylized form.

Referring to FIGS. 2A and 2B, the digital ink annotation system 100 also includes a user feedback module 280 that provides an interface whereby the user can interact with the digital ink annotation system 100. This user feedback insures the accuracy and efficacy of the system 100. The feedback user interface 280 can control aspects of the classification module 200, the anchoring module 210, the reflow module 250 and the clean-up module 260, and thus allows the user to interact with and override the automatic functionality of these modules. The dashed lines connecting the feedback user interface 280 to these four modules indicates that user feedback is optional in each case.

By way of example, the classification module 200 may display an annotation's grouping, classification, and anchor context via the feedback user interface 280. The user can inspect this information and may choose to modify it, for instance by changing the grouping of ink strokes that compose the annotation, or changing the annotation's classification, or changing the region in the document with which the annotation is associated. The user may use the feedback user interface 280 to modify how the anchoring module 210 generates logical anchors for annotations, for instance by changing the type of features that are extracted from the digital document 160 to describe anchor contexts. The user may use the feedback user interface 280 to manually specify which set of rules the reflow module 250 should use when reflowing a particular annotation, for instance if the default set of reflow rules for the annotation's type are incorrect considering the annotation's particular characteristics. Finally, the user may use the feedback user interface 280 to manually specify which set of rules the clean-up module 260 should use when displaying a formalized or "cleaned-up" version of an annotation, for instance if the default set of "clean-up" rules for the annotation's type is incorrect given the annotation's particular characteristics. Through the feedback user interface 280, a user is capable of interacting with the system 100 to further enhance its accuracy, reliability and effectiveness.

Figure 3:
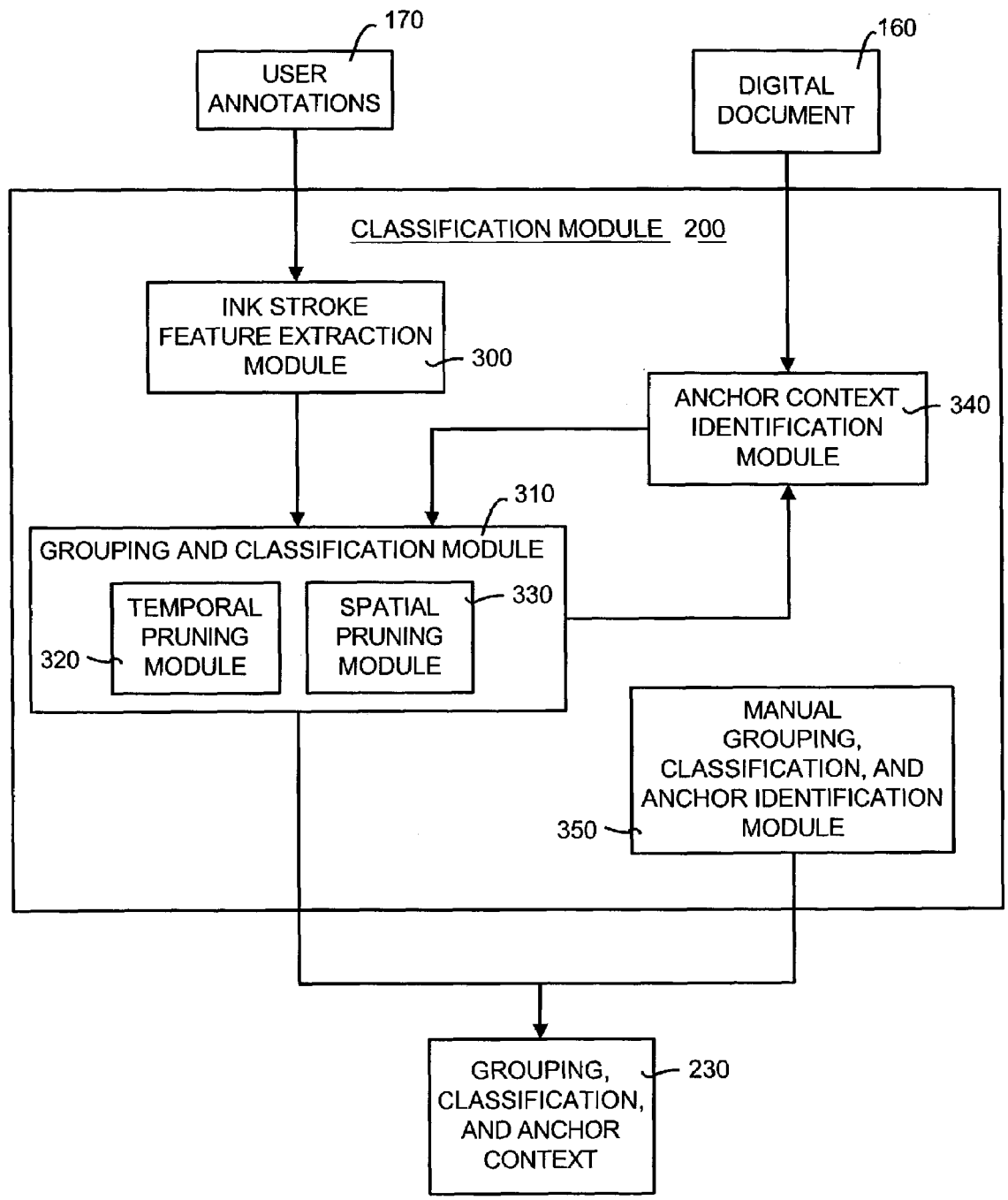
FIG. 3 is a block diagram illustrating the details of an exemplary implementation of the classification module shown in FIG. 2A.

FIG. 3 is a block diagram illustrating the details of an exemplary implementation of the classification module 200 shown in FIG. 2A. Generally, the classification module 200 uses features of the user annotations 170 and contextual information from the digital document 160 to group and classify each annotation and to determine an appropriate anchor context, and outputs grouping, classification, and anchor context combinations 230 for each annotation. The classification module 200 includes an ink stroke feature extraction module 300; a grouping and classification module 310 having a temporal pruning module 320 and a spatial pruning module 330; an anchor context identification module 340; and a manual grouping, classification, and anchor identification module 350.

The ink stroke feature extraction module 300 measures the characteristics of the ink strokes in the user annotations 170. For a particular ink stroke these characteristics may include, for example, the angle of orientation of the stroke, the length of the stroke, the time at which the stroke was made relative to all other ink strokes, and the position of the stroke with respect to all the other ink strokes. These characteristics are fed into the grouping and classification module 310 to determine the correct grouping of ink strokes together.

The grouping and classification module 310 is responsible for grouping the ink strokes in user annotations 170 into distinct groups with appropriate class labels and anchor contexts in a globally optimal way. In general, the grouping and classification module 310 uses dynamic programming to evaluate all possible groupings and classifications of the ink strokes comprising the user annotations 170, and to determine the optimal—or most likely correct—grouping and classification of all strokes into distinct, all-inclusive, non-overlapping groups. Evaluating all possible groupings and classifications is combinatorially expensive in terms of computer processing time, so the dynamic programming search space is pruned upfront based on the temporal ordering of strokes (using the temporal pruning module 320), or the spatial arrangement of strokes (using the spatial pruning module 330), or both. In other words, only groups of strokes that are proximate to one another in time and/or space are considered as part of the grouping and classification module's 310 dynamic program. The justification for this upfront pruning is that ink strokes that are distant from one another in time or space are unlikely to belong together in a group.

Each of the remaining possible groups of strokes that is evaluated by the grouping and classification module 310 is assigned a probability based on how likely the strokes in the group are to form one of the types of annotation the system recognizes (e.g. underline, highlight, circle, margin comment, margin bar, or connector), and then the group is passed on to the anchor context identification module 340. The anchor context identification module 340 then attempts to identify the most likely anchor context for the group. For example, if the ink strokes in a particular group are horizontal lines and the grouping and classification module 310 has determined that the group probably represents an underline annotation, the anchor context identification module 440 will look for words in the document that lie directly above the lines. If the ink strokes in another group are determined to most likely form a circle annotation, the anchor context identification module 340 will look for the words that are enclosed by the circle. The anchor context identification module makes its best guess as to the anchor context for the group of ink strokes it has been presented with, assigns a probability that the anchor context is correct, and passes this information back to the grouping and classification module 310.

The grouping and classification module 310 receives the anchor context identification information for the group, combines it with the original classification probability that it calculated for the group, and places the combined value in its dynamic programming subproblem solution table. If a particular grouping of ink strokes has an unlikely classification and/or an unlikely anchor context (for instance, there are no words above the lines in a group of ink strokes that were initially classified as an underline), this will reduce the likelihood that this particular group is included in the final total grouping of all strokes in user annotations 170 determined by the grouping and classification module 310. When the grouping and classification module 310 has evaluated all possible groupings (that were not pruned upfront), it walks through its subproblem solution table and chooses the set of grouping/classification/anchor context combinations that account for all strokes in user annotations 170, do not overlap, and maximize the combined grouping probability. This complete optimal grouping is then output as the grouping, classification, and anchor context combinations 230.

The manual grouping, classification, and anchor identification module 350 provides a user interface by which the user can manually select a set of ink strokes, classify it according to the list of recognized annotation types, and specify its anchor context. If the user elects to use this interface, either to circumvent the automatic grouping process or to correct a mistake in the automatic process, whatever is manually chosen is regarded as better than the automatic process can achieve, and the ink strokes in the grouping are subsequently ignored by the automatic process.

Figure 4:
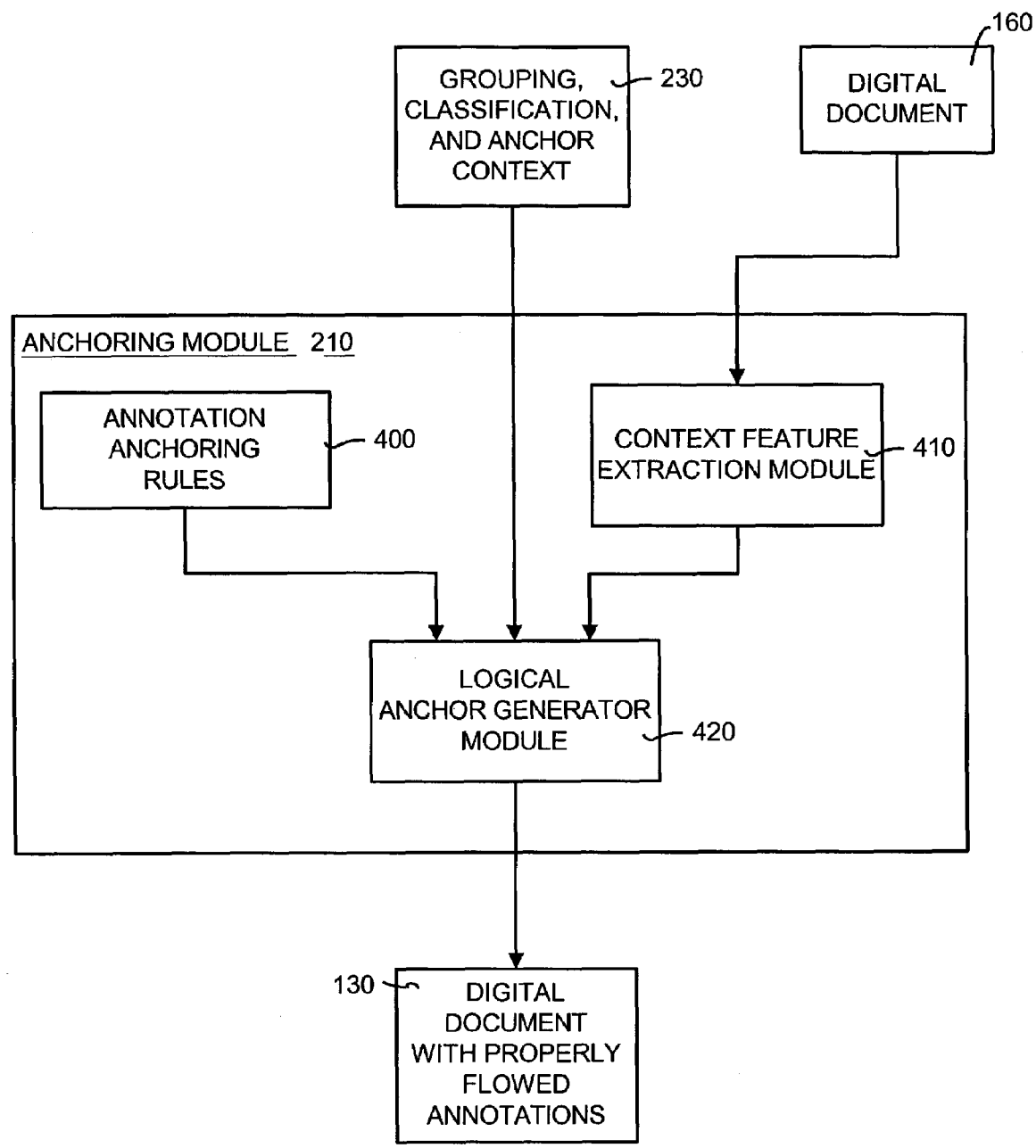
FIG. 4 is a block diagram illustrating the details of an exemplary implementation of the anchoring module shown in FIG. 2A.

FIG. 4 is a block diagram illustrating the details of an exemplary implementation of the anchoring module 210 shown in FIG. 2A. In general, the anchoring module 210 uses the grouping, classification, and anchor context combinations 230 output by the classification module 200 to generate logical anchors that associate each group of strokes with its intended anchor region in the document, in such a way that the anchor region for each group can be recovered even if the layout and/or content of the document is changed. The anchoring module 210 includes annotation anchoring rules 400, the context feature extraction module 410, and the logical anchor generator module 420.

The anchoring module 210 takes as input the grouping, classification, and anchor context combinations 230 output by the classification module 200 and the digital document 160. The annotation anchoring rules 400 dictate how each distinct annotation type is anchored. For example, an underline annotation is anchored to the text that it underlines, while a circle is anchored to the text that it encloses. The context feature extraction module 410 extracts salient anchoring features from the digital document 160 and makes them available to the logical anchor generator module 420. For each ink stroke grouping, the logical anchor generator module 420 chooses the appropriate anchor features, from among those extracted, based on the grouping's classification and the anchoring rules for that type of annotation. The anchor features are assigned to the grouping as the grouping's logical anchor. The grouping, along with its classification, its anchor context, and its logical anchor, is then considered a fully reflowable annotation. After the logical anchor generator module 420 has completed its task for all grouping, classification, and anchor context combinations 230, the fully reflowable annotations are ready for display on the digital document 160, and a digital document with properly flowed annotations 130 is produced.

Figure 5:
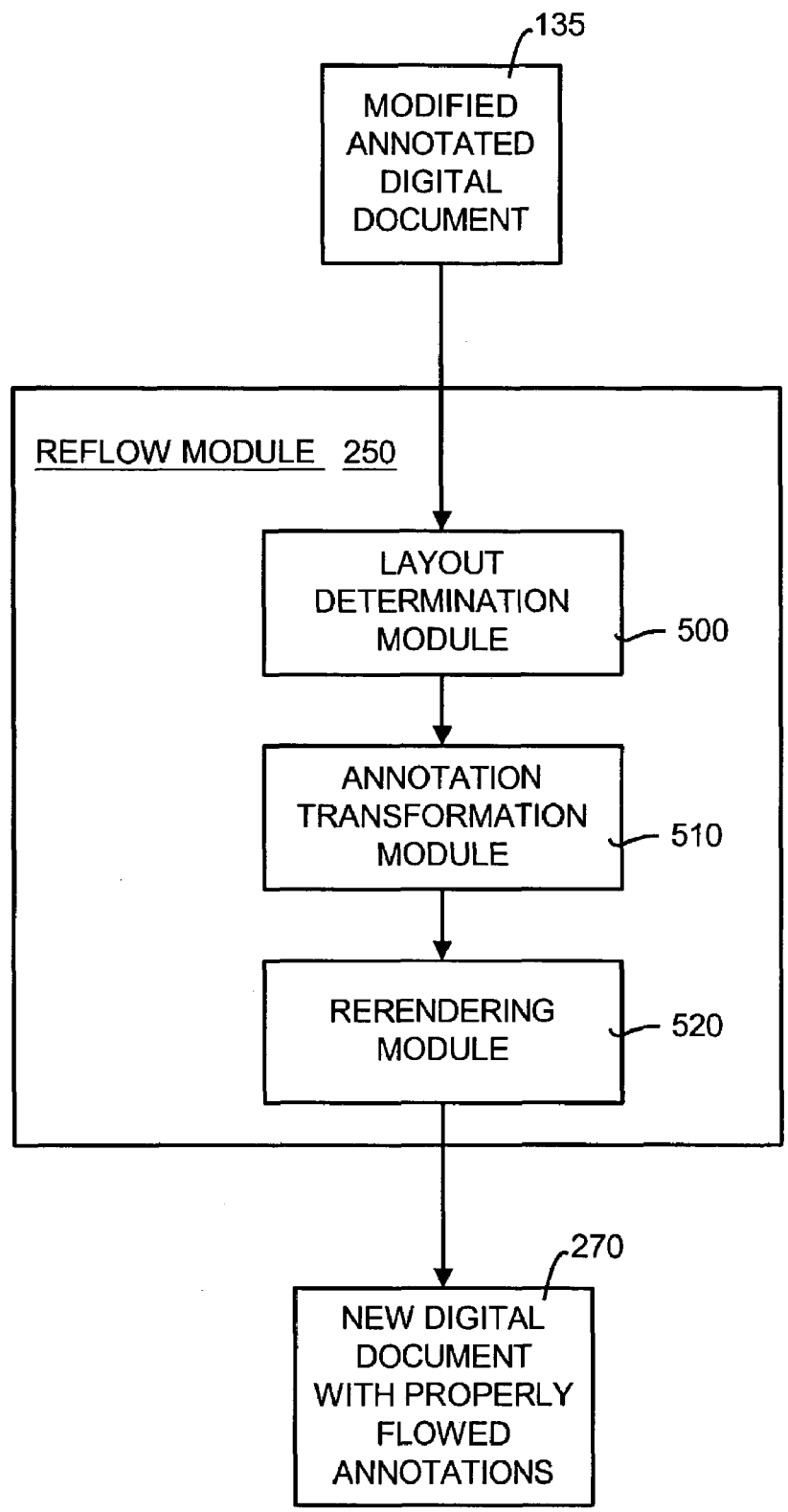
FIG. 5 is a block diagram illustrating the details of an exemplary implementation of the reflow module shown in FIG. 2B.

FIG. 5 is a block diagram illustrating the details of an exemplary implementation of the reflow module 250 shown in FIG. 2B. In general, the reflow module 250 transforms and rerenders each fully reflowable annotation on a modified annotated digital document 135 based on the annotation's logical anchor and its classification. The reflow module 250 includes a layout determination module 500, an annotation transformation module 510, and a rerendering module 520, and it outputs a new digital document with properly flowed annotations 270.

The reflow module 250 takes as its input a modified annotated digital document 135 which has had its layout modified since the last time the annotations on the document were reflowed. For each annotation on the document, the layout determination module 500 recovers the annotation's anchor context using the annotation's logical anchor, and determines the new layout of the annotation's anchor context. Once the new layout is determined, the annotation transformation module 510 is used to transform the annotations such that they conform to the new document layout (e.g. they "keep up" with the position in the document where they were originally intended to go). Conformation processing is different for each distinct annotation type. For underline annotations, for instance, it includes join operations to join two or more underline ink strokes that fall on the same line of text, and split operations to split an underline ink stroke that spans two or more lines of text in the new layout. For circle annotations, it includes affine transformations (translations, rotations, and scalings) so they agree with the new layout of their anchor contexts.

IV. Operational Overview

The digital ink annotation system 100 disclosed herein uses a digital ink annotation process to process the annotations such that the annotations are dynamically adaptable. This means that when a document containing the annotations is modified the annotations can adapt to a new layout of the document. This dynamic adaptability insures that the original intent and meaning of each annotation is preserved.

The digital ink annotation process includes three main features. First, the ink strokes of a digital ink annotation are grouped and classified, and a likely anchor context is identified. Second, a logical anchor is generated for the classified annotation which identifies the region in the document with which the annotation is associated in such a way that the region can be recovered if the document's layout and/or content change. Anchoring the annotation insures that the annotation will be placed in the correct region of the document even after the document is modified. Third, the processed digital ink annotations are reflowed or rerendered if the document's layout changes.

Figure 6:
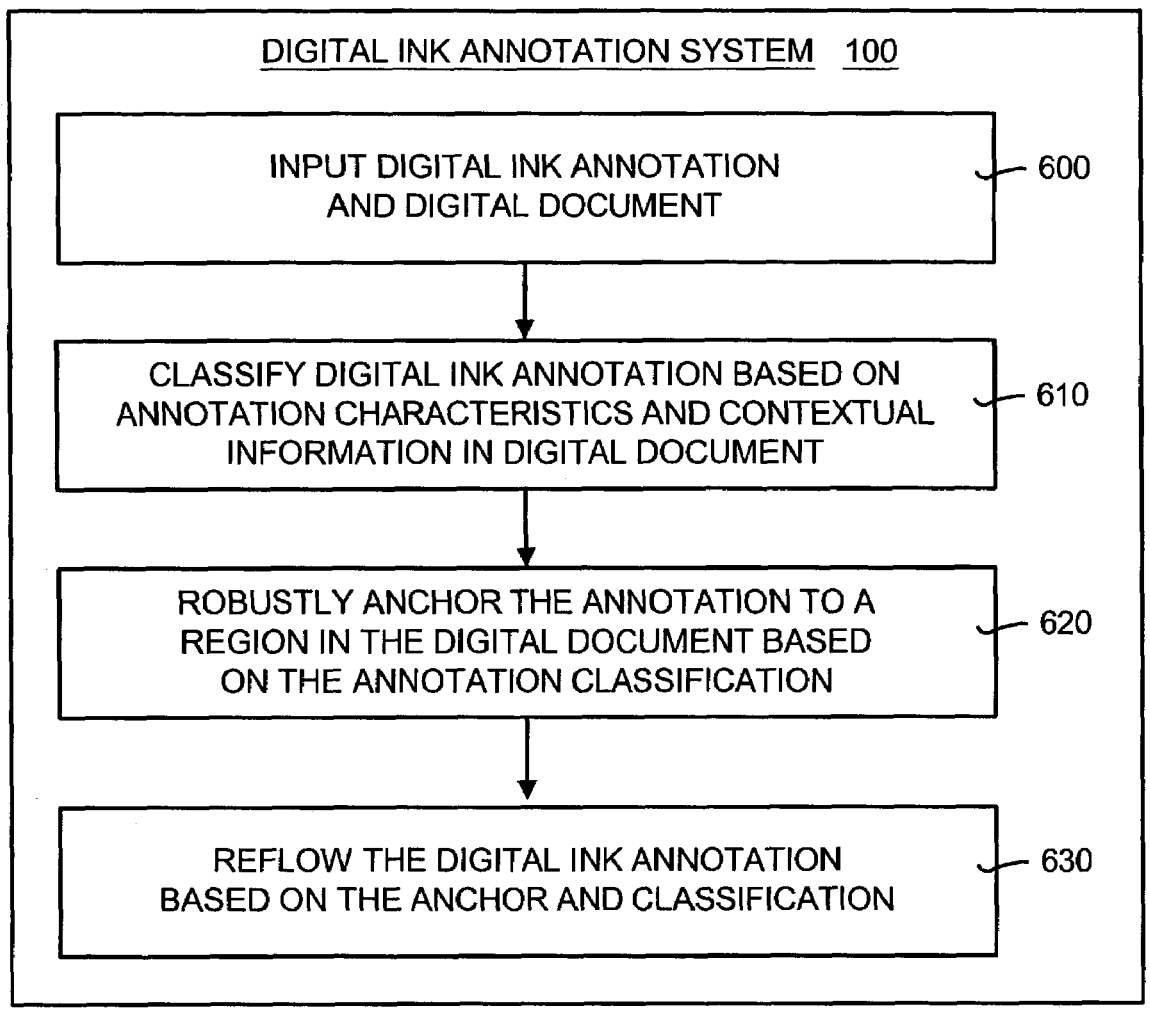
FIG. 6 is a general flow diagram illustrating the operation of the digital ink annotation process of the digital ink annotation system shown in FIGS. 1, 2A and 2B.

FIG. 6 is a general flow diagram illustrating the operation of the digital ink annotation process of the digital ink annotation system 100 shown in FIGS. 1, 2A and 2B. The method begins by inputting a digital ink annotation and a digital document (box 600). The digital ink annotation then is classified, and an anchor context is identified (box 610). This classification is performed based on annotation characteristics and contextual information in the digital document. Next, the annotation is robustly anchored to a region or position in the digital document (box 620). This anchoring is based on the annotation classification and the anchor context that was identified. Finally, the digital ink annotation is reflowed in the new layout of the digital document (box 630). This reflow process is based on the annotation anchor and the annotation classification.

V. Operational Details

Figure 7:
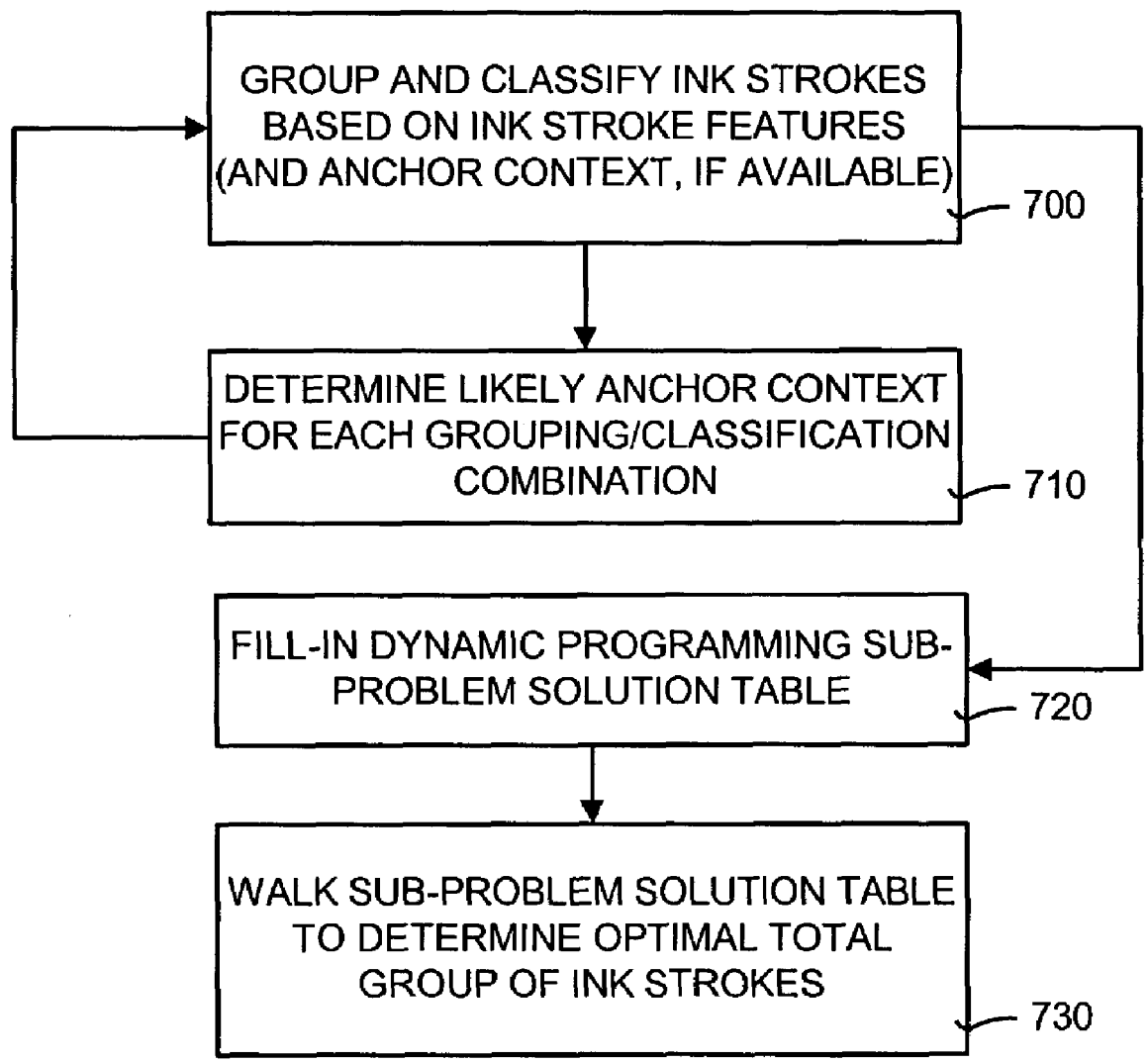
FIG. 7 is a detailed flow diagram illustrating the operation of the classification process for the digital ink annotation process shown in FIG. 6.

FIG. 7 is a detailed flow diagram illustrating the operation of the classification process for the digital ink annotation process shown in FIG. 6. The method begins by grouping the ink strokes on a digital document in all possible ways, pruning according to time and space proximity constraints, and evaluating each group for the likelihood that the combination of ink strokes it contains conforms to the characteristics of each annotation class (box 700). Then, the most likely anchor context is determined for each grouping/classification combination (box 710). A dynamic programming sub-problem solution table is filled-in with the likelihood of each grouping/classification/context anchor combination (box 720). And finally, after all sub-problems (that were not pruned) have been evaluated, the sub-problem solution table is walked to determine the optimal total grouping of ink strokes which accounts for all strokes, does not include overlapping groups, and maximizes the combined probability of all groups (box 730).

When a user marks up the digital document, the process groups ink strokes to define what type of annotation the strokes comprise. For example, the annotation might be an underline, circle, connector, margin bar, or margin comment. The grouping takes place at roughly the same level of abstraction and with the same accuracy as a human would group the ink strokes and define an annotation.

Combining ink strokes into groups may be based on the temporal order in which the strokes were created, or the spatial arrangement of strokes, or a combination of both. This is another way of saying that the grouping and classification algorithm's dynamic programming search space is pruned based on temporal and spatial proximity constraints. Relying on temporal order is fast and easy. In addition, temporal grouping exploits the fact that the ink strokes used in most annotations are created sequentially. However, there may be times when strokes are created out of order. For example, when a user goes back and dots an "i" or crosses a "t". In this situation, spatial arrangement becomes a better criteria for grouping.

Digital ink annotations are ambiguous by nature and improper classification can yield confusing behavior. For example, if a horizontal arrow pointing to the text is erroneously classified as an underline, the arrow may be split across multiple lines when reflow occurs. Thus, in some embodiments completely automated grouping and classification may not be feasible. In these embodiments, a hybrid approach may be used, such as requesting a user's help when the confidence estimate for a total grouping is below a certain threshold.

FIG. 8A illustrates a user annotating a digital document by creating digital ink strokes on the document. In this case, the word "how?" has been written in the margin and the text referred to by the annotation has been circle. FIG. 8B illustrates the manual grouping and classification of the annotation. FIG. 8C illustrates the reflowing of the document and annotation using the digital ink annotation process (regardless of whether the annotation was automatically or manually grouped and classified). Note that the annotation in the reflowed document in FIG. 8C "agrees" with the annotation in the original document of FIG. 8A because it has been moved—or reflowed—to keep up with where it belongs in the document.

Figure 9:
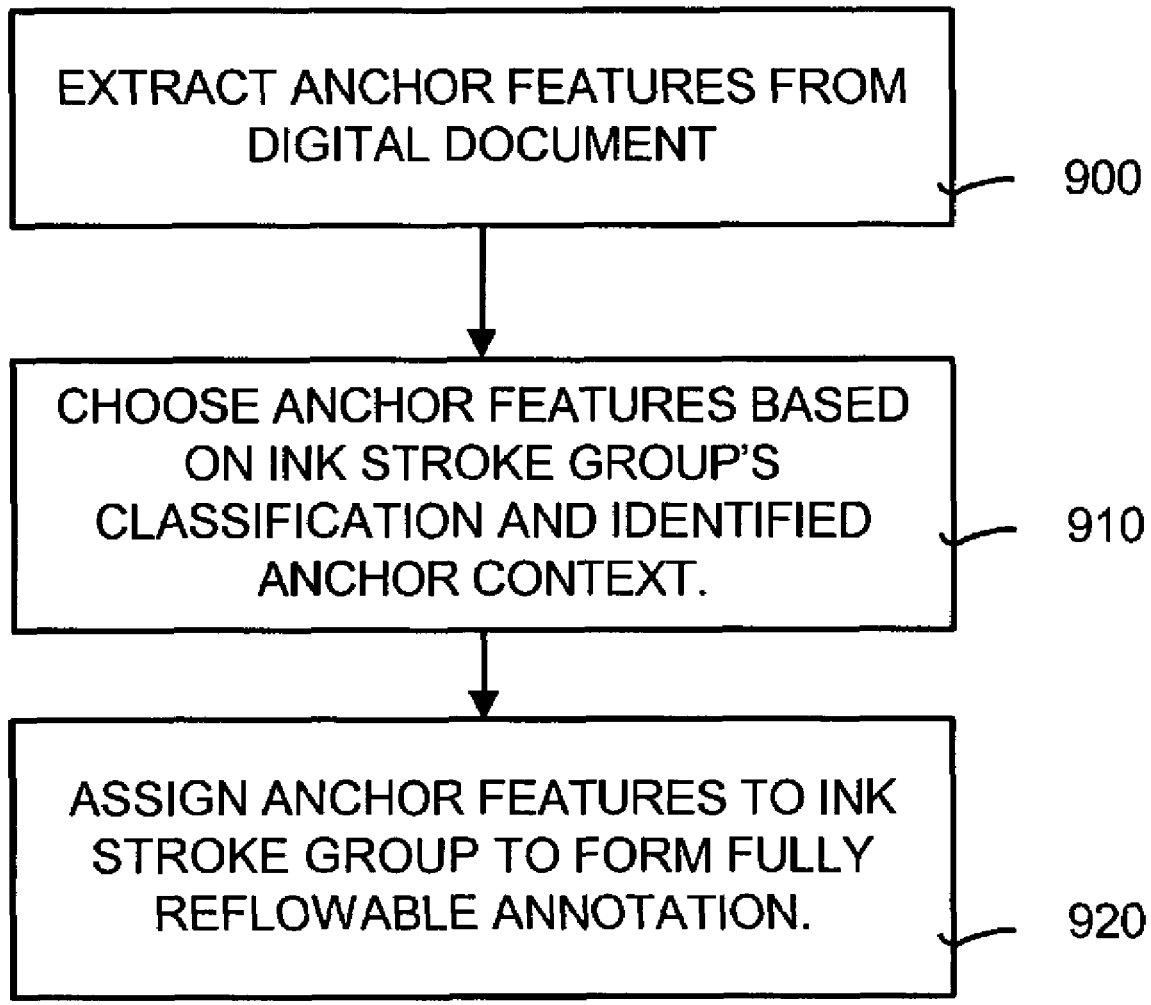
FIG. 9 is a detailed flow diagram illustrating the operation of the anchoring classification process for the digital ink annotation process shown in FIG. 6.

FIG. 9 is a detailed flow diagram illustrating the operation of the logical anchoring process for the digital ink annotation process shown in FIG. 6. Logical anchoring insures that when the document layout changes and its annotations are consequently reflowed, the original meaning and intent of the annotations are preserved. For example, if an annotation has been classified as an underline, then the annotation must remain under the range of text being underlined. This may require splitting or joining of ink strokes comprising the annotation depending on if the text range to which the annotation is anchored is reflowed. If, on the other hand, the annotation has been classified as an arrow connector, then it must remain pointing at what it was originally pointing to and from. The arrow connector, however, can be otherwise stretched, rotated and translated during reflow.

After the ink strokes of the annotation are grouped and the annotation is classified, the classified annotation must be logically anchored to its intended content. In other words, the annotation must be anchored to a region or position in the document where it belongs such that the meaning and intent of the annotation can be recovered even if the document's layout, format, or content changes.

Annotations made with a pen on paper are affixed to a particular position on a paper document. However, physical position in a digital document loses its meaning when the digital document is reflowed. Instead, the annotation must be anchored to its surrounding logical context (such as the range of text the annotation is near). This is challenging for two reasons. First, digital ink annotations often do not offer a strong indication of where they should be anchored. For instance, comments in the margin may pertain to a text range in the immediate vicinity or on the other side of the page. Second, the document may be edited between when it was originally annotated and when the annotation is displayed. This makes it harder to recover the anchor context of the annotation.

One way to achieve a robust anchoring is to employ sophisticated automatic analysis of document contents. These robust anchoring techniques are known in the art. For example, one robust anchoring technique that may be used with the digital ink annotation process is found in a paper by A. J. Brush, D. Bargeron, A. Gupta and J. J. Cadiz entitled "Robust Annotation Positioning in Digital Documents", in *Proceedings of CHI* 2001, pp. 285–292, ACM Press 2001. Automatic techniques, however, may still result in errors, and the digital ink annotation process also includes a provision for asking a user to explicitly specify the anchor for a given annotation if it is determined that the annotation's anchor cannot be recovered from its logical anchor (if, for instance, the anchor context the logical anchor describes has been removed from the document).

Referring to FIG. 9, the anchoring method begins by extracting anchor features from the digital document that is being annotated (box 900). Next, anchor features are chosen for each group of ink strokes produced by the grouping and classifying process in FIG. 7 based on the group's classification and anchor context, and according to a set of anchoring rules for each annotation type (box 910). These per-annotation-type rules are discussed in more detail below. Finally, the appropriate anchor features are assigned to each ink stroke group to form fully reflowable annotations. After all annotations have been anchored to a document, the annotations are ready to be reflowed such that if the document layout changes, the annotations can keep up with where they belong in the document and can retain their visual meanings.

Figure 10:
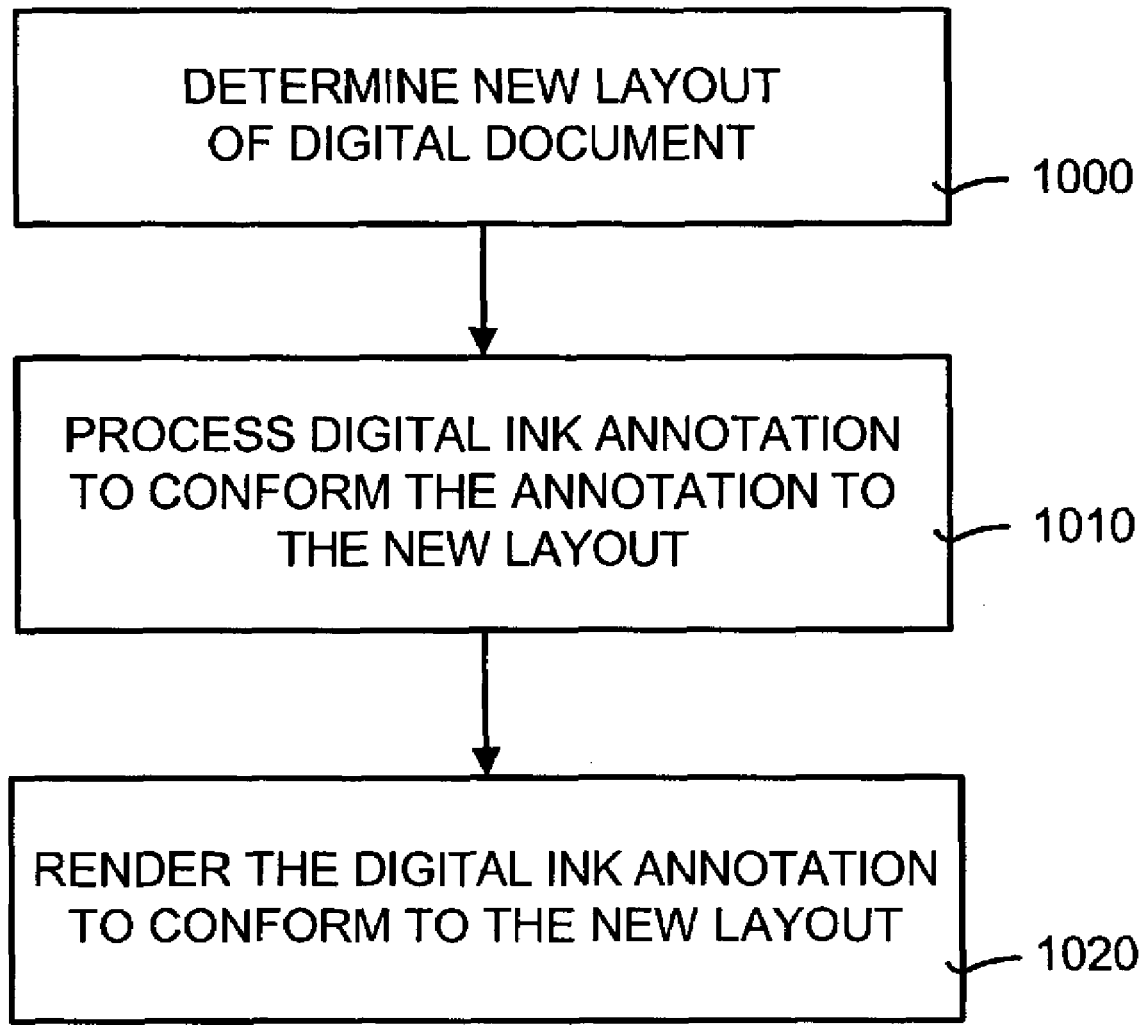
FIG. 10 is a detailed flow diagram illustrating the operation of the reflow classification process for the digital ink annotation process shown in FIG. 6.

FIG. 10 is a detailed flow diagram illustrating the operation of the reflow classification process for the digital ink annotation process shown in FIG. 6. If the original document changes, the reflow process rerenders annotations based on their classifications and their logical anchors to "keep up" with where they belong in the document. For example, if a sentence is underlined and the column in which the sentence resides is made thinner, the sentence may have to be reflowed to more lines than it originally occupied. In this case, the underline ink annotation must be divided and displayed on more lines than it was originally drawn. As another example, if a paragraph has been circled and the column in which it resides is made wider, then the circle ink annotation surrounding the paragraph must be stretched wide and made shorter.

The reflow process begins by determining the new layout of a digital document (box 1000). Next, a digital ink annotation is transformed to conform to the new layout (box 1010). Finally, the newly transformed digital ink annotation is rerendered over the new document layout (box 1020).

The digital ink annotation process automatically recognizes the six most common types or classifications of "active reading"-type digital ink annotations, and the system is extensible so that it can recognize more annotation types (such as editing marks) in the future. The types of annotations that are automatically recognized include underline annotations, highlight annotations, marginalia or "margin comment" annotations, circle annotations, margin bracket annotations, and callout or "connector" annotations. The annotation characteristics, context, and anchoring rules for each of these annotation classifications will now be discussed.

In order to illustrate the principles described above, FIGS. 12A–G are offered as an example of how the digital ink annotation process can operate. In FIGS. 12A–G, column "A" represents a user's annotation of a digital document using digital ink strokes; column "B" represents the annotation reflowed in a new document layout; and column "C" represents the "clean-up" annotation that has been stylized by the clean-up module.

Underline Annotations

Referring to FIG. 11A, underline annotations are composed of one or more approximately horizontal straight-line ink strokes. In the context of a digital document, underline annotations are typically found under text, especially one or more words.

Each ink stroke in an underline annotation is anchored separately to the range of text that it underlines. The words within the range of text and their sequence is known, and this information is used to control how the ink stroke is reflowed when and if the range of text is reflowed in the document.

During reflow, if multiple strokes fall adjacent to one another on the same line of text, they will be fused together; and if one underline stroke happens to fall across two or more lines, it will be divided and its parts will be moved appropriately to remain under the originally underlined context.

Highlight Annotations

Referring to FIG. 11B, the unique characteristics of highlight annotations include the fact that they are like a strikethrough, except that the ink strokes comprising a highlight are thick and the ink is partially transparent. Otherwise, highlight annotations are treated similarly to underlines: The context is determined in a similar manner to underline annotations, except that highlight ink strokes are approximately directly over the range of text to which they should be anchored (as opposed to lying under the line of text, as is the case with underline annotations). And the reflow rules for highlight annotations are also similar to underline annotations, except that during reflow the ink stroke is on the text range and the ink is wide and partially transparent.

Marginalia Annotations

Referring to FIG. 11C, marginalia or margin comment annotations are defined as any digital ink stroke that is in the margin or white space of the digital document, but is not otherwise a connector. Marginalia includes drawings, symbols (such as "!" and "*"), and text within the margins or white space.

The rule for anchoring marginalia annotations is that they are anchored to whatever portion of the document to which they are horizontally adjacent. A top horizontal line, corresponding to the top of the marginalia annotation's bounding box, and a bottom horizontal line, corresponding to the bottom of the marginalia annotation's bounding box, are projected across the document from wherever the marginalia annotation is positioned. The document content in between the top and bottom horizontal lines are considered marginalia annotation's anchor context.

When the document's layout changes, marginalia annotations are translated vertically such that they remain vertically centered next to their anchor contexts. For example, assume that a marginalia annotation in an original digital document is anchored to four lines of text. Next, assume that the layout of the digital document is modified such that the four lines of text becomes eight lines of text. In this case the anchored marginalia annotation is centered in the vertical direction, adjacent to the eight lines of text.

Circle Annotations

Referring to FIG. 11D, circle annotations are divided into two types: "inline" circles and a "region" circles. Inline circles typically circumscribe a single line of text, and region circles typically circumscribe multiple partial lines of text or other document content. A group of ink strokes may be recognized as some kind of circle if the strokes form a shape with no concavities, and groups of ink strokes that form circles may be differentiated into inline circles and region circles depending on their likely anchor context. For instance, if the circle encloses one line of text, it can be labeled an inline circle; while if the circle encloses text that falls on more than one line, it can be labeled a region circle.

Circles of either type are anchored to the text and other document content they circumscribe.

During reflow, the inline circle annotation type is typically translated horizontally to keep up with its anchor context until its anchor context (e.g. the range of text it circumscribes) splits across two or more lines. When a split such as this occurs, the circle is copied, scaled, and translated such that the two or more portions of text comprising the original anchor context are individually circled. Referring to FIG. 11E, region circle annotations are scaled and translated to keep encircling their anchor contexts, but they are not copied.

Margin Bracket Annotations

Referring to FIG. 11F, margin bracket annotations are similar to marginalia annotations. Groups of ink strokes are recognized as margin bracket annotations if they form approximately vertical lines in the document margins which are "close" to document content.

Similarly to how marginalia annotations are anchored, margin bracket annotations are anchored to whatever portion of the document to which they are horizontally adjacent. Top and bottom horizontal lines are generated, and the document content in between the top and bottom horizontal lines is considered the margin bracket annotation's anchor.

Unlike marginalia annotations, when the text range to which a margin bracket annotation is anchored is reflowed, the marginal bracket annotation is translated and scaled accordingly in the vertical direction, so that the bracket appears to stretch to keep bracketing its entire anchor context.

Callout or Connector Annotations

Referring to FIG. 11G, callout or connector annotations are annotations that link regions by going from one position to another position. One characteristic of the ink strokes comprising a callout or connector annotation is that they are not straight, but may have some curvature. Another characteristic is that the callout or connector annotation is at an angle to the horizontal and vertical directions. Still another characteristic is that the ends of the callout or connector annotation are adjacent to text or content of the document, digital ink strokes from other annotations, or both. In other words, the callout or connector annotations are connecting text or content with an annotation or other text or content.

The anchoring rules for callout or connector annotations are based on anchoring the callout's endpoints. For each endpoint, the document content or other freeform digital ink annotation closest to the endpoint is considered its anchor context. Thus, each callout has two separate and distinct anchor contexts.

During reflow, the callout is translated, rotated, and scaled such that each endpoint remains constant relative to its anchor context. This can be seen in FIG. 11G.

VI. Working Example

In order to more fully understand the digital ink annotation method and system disclosed herein, the details of an exemplary working example are presented. It should be noted that this working example is only one way in which the digital ink annotation process and system disclosed herein may be implemented.

Hardware

For the working example, the digital ink annotation method was implemented to run on any Tablet PC hardware running Microsoft WindowsXP Tablet PC Edition operating system. These kind of computers support a pen input digitizer integrated into their display screens, thus allowing the computer to mimic the form factor of a writing pad. Users interact with the computer using a stylus, which enables a user to control the cursor and write directly on the screen.

Software

Figure 12:
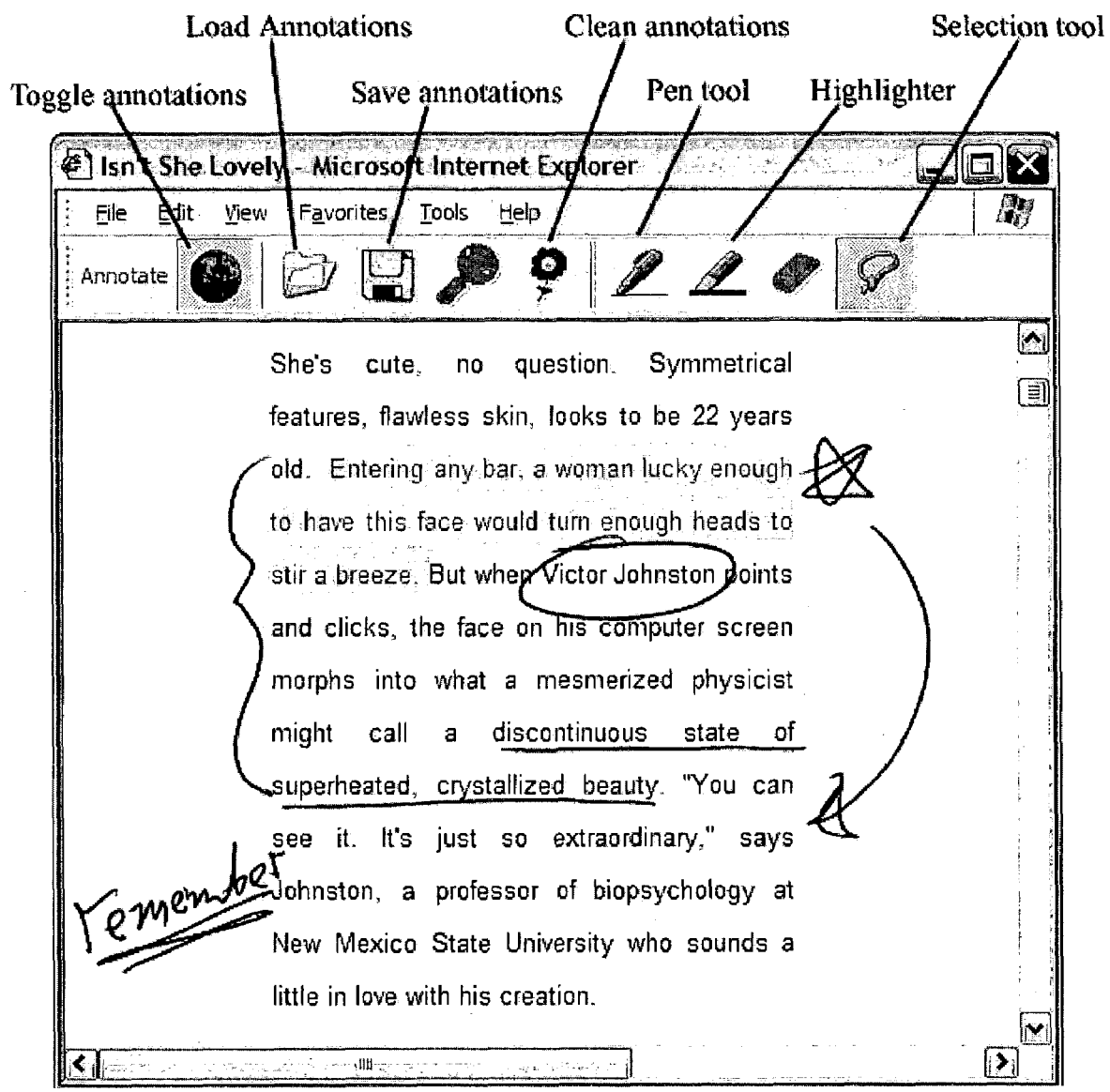
FIG. 12 illustrates the toolbar of a working example of the digital ink annotation process and system.

In this working example, the digital ink annotation process and system disclosed herein was embodied as a plug-in for Microsoft Internet Explorer (IE). This plug-in (codenamed "Callisto") supports an IE toolbar with pen and highlighter tools that allow a user to mark any part of any web page with digital ink. The ink strokes persist in a local cache on the user's machine. FIG. 12 illustrates the toolbar of the digital ink annotation process and system that facilitates drawing and classifying digital annotations on a digital document.

Grouping, Classifying and Anchoring

In order to group and classify raw digital ink strokes into digital annotations, the digital ink annotation process and system embodied in Callisto allows a user to select automatic grouping and classification, or manual grouping and classification. If automatic grouping and classification is chosen, the Callisto software makes automatic decisions about grouping and classifying the user's ink strokes, and automatically determines annotation anchors, according to the process detailed in sections III, IV, and V above.

If manual grouping and classification is chosen, the user first selects the ink strokes he wishes to group together using the selection tool. Next, the user chooses a classification from the predetermined list of annotation types. Referring back to FIG. 9B, a user manually selects an annotation classification from a predetermined list of annotations. This list of annotation types includes underlines, highlights, marginalia (such as margin comments and symbols), circles, margin bars, and connectors. Choosing one of these annotation types automatically anchors the selected group of strokes as an annotation to a context in the document. This anchoring is performed using the set of rules outlined in Section V above.

Reflowing Digital Annotations

After grouping, classification and anchoring, whenever the IE document window is resized the digital ink annotation process and system automatically reflows any annotations on the current page so that they keep up with their respective anchor contexts per the process outlined in Sections 111, IV, and V above.

Cleaning-Up Digital Annotations

Besides reflowing the digital annotations to preserve the user's original drawing style, the digital ink annotation process and system embodied in the Callisto plug-in for IE can also draw formalized "cleaned-up" versions of digital annotations per the process outlined in Section III above. In this working example, the digital ink annotation process and system cleaned-up the annotations as follows: The digital ink annotation process and system rendered underline annotations as straight line segments, highlight annotations as translucent horizontal rectangles over the anchor text, circles as round-cornered rectangles, margin bars as simple Bezier curves spanning the height of the anchor text, and connectors are straight lines running between their endpoint anchor contexts. Margin comments and symbols were not parsed and were left as the user drew them, since they typically contain so much variance and individual style it is very difficult to transform them into an acceptable formalized style.

VII. Exemplary Operating Environment

The digital ink annotation process and system disclosed herein is designed to operate in a computing environment. The following discussion is intended to provide a brief, general description of a suitable computing environment in which the digital ink annotation process and system may be implemented.

Figure 13:
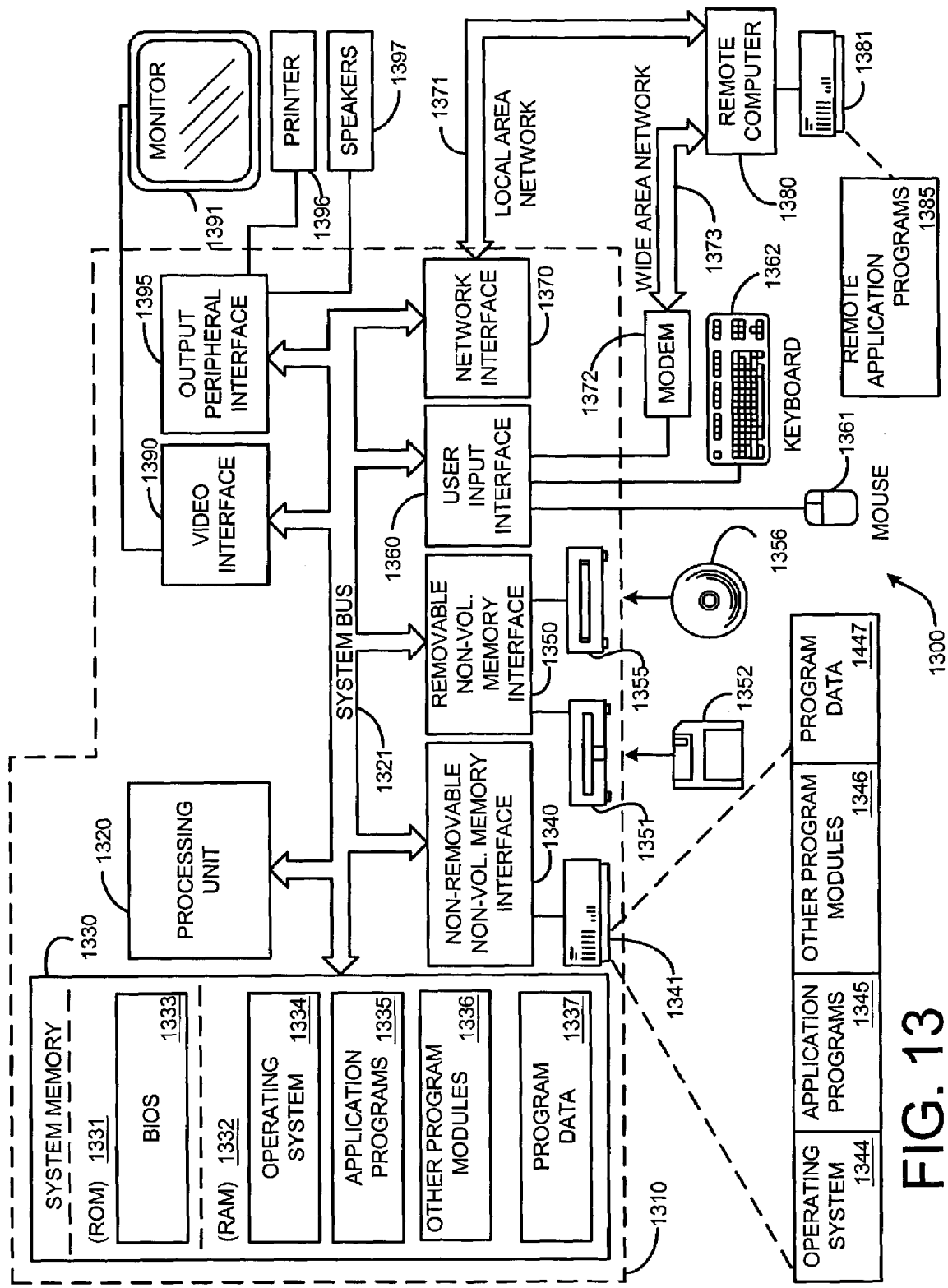
FIG. 13 illustrates an example of a suitable computing system environment in which the digital ink annotation process and system shown in FIG. 1 may be implemented.

FIG. 13 illustrates an example of a suitable computing system environment 1300 in which the digital ink annotation process and system may be implemented. The computing system environment 1300 is only one example of a suitable computing environment and is not intended to suggest any limitation as to the scope of use or functionality of the invention. Neither should the computing environment 1300 be interpreted as having any dependency or requirement relating to any one or combination of components illustrated in the exemplary operating environment 1300.

The digital ink annotation process and system is operational with numerous other general purpose or special purpose computing system environments or configurations. Examples of well known computing systems, environments, and/or configurations that may be suitable for use with the digital ink annotation process and system include, but are not limited to, personal computers, server computers, handheld, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The digital ink annotation process and system may be described in the general context of computer-executable instructions, such as program modules, being executed by a computer. Generally, program modules include routines, programs, objects, components, data structures, etc., that perform particular tasks or implement particular abstract data types. The digital ink annotation process and system may also be practiced in distributed computing environments where tasks are performed by remote processing devices that are linked through a communications network. In a distributed computing environment, program modules may be located in both local and remote computer storage media including memory storage devices. With reference to FIG. 13, an exemplary system for implementing the digital ink annotation process and system includes a general-purpose computing device in the form of a computer 1310 (the computer 1310 is an example of the computing device 140 shown in FIG. 1).

Components of the computer 1310 may include, but are not limited to, a processing unit 1320, a system memory 1330, and a system bus 1321 that couples various system components including the system memory to the processing unit 1320. The system bus 1321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1310 typically includes a variety of computer readable media. Computer readable media can be any available media that can be accessed by the computer 1310 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1310. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1330 includes computer storage media in the form of volatile and/or nonvolatile memory such as read only memory (ROM) 1331 and random access memory (RAM) 1332. A basic input/output system 1333 (BIOS), containing the basic routines that help to transfer information between elements within the computer 1310, such as during start-up, is typically stored in ROM 1331. RAM 1332 typically contains data and/or program modules that are immediately accessible to and/or presently being operated on by processing unit 1320. By way of example, and not limitation, FIG. 13 illustrates operating system 1334, application programs 1335, other program modules 1336, and program data 1337.

The computer 1310 may also include other removable/non-removable, volatile/nonvolatile computer storage media. By way of example only, FIG. 13 illustrates a hard disk drive 1341 that reads from or writes to non-removable, nonvolatile magnetic media, a magnetic disk drive 1351 that reads from or writes to a removable, nonvolatile magnetic disk 1352, and an optical disk drive 1355 that reads from or writes to a removable, nonvolatile optical disk 1356 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1341 is typically connected to the system bus 1321 through a non-removable memory interface such as interface 1340, and magnetic disk drive 1351 and optical disk drive 1355 are typically connected to the system bus 13221 by a removable memory interface, such as interface 1350.

The drives and their associated computer storage media discussed above and illustrated in FIG. 13, provide storage of computer readable instructions, data structures, program modules and other data for the computer 1310. In FIG. 13, for example, hard disk drive 1341 is illustrated as storing operating system 1344, application programs 1345, other program modules 1346, and program data 1347. Note that these components can either be the same as or different from operating system 1334, application programs 1335, other program modules 1336, and program data 1337. Operating system 1344, application programs 1345, other program modules 1346, and program data 1347 are given different numbers here to illustrate that, at a minimum, they are different copies. A user may enter commands and information into the computer 1310 through input devices such as a keyboard 1362 and pointing device 1361, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 1320 through a user input interface 1360 that is coupled to the system bus 1321, but may be connected by other interface and bus structures, such as, for example, a parallel port, game port or a universal serial bus (USB). A monitor 1391 or other type of display device is also connected to the system bus 1321 via an interface, such as a video interface 1390. In addition to the monitor, computers may also include other peripheral output devices such as speakers 1397 and printer 1396, which may be connected through an output peripheral interface 1395.

The computer 1310 may operate in a networked environment using logical connections to one or more remote computers, such as a remote computer 1380. The remote computer 1380 may be a personal computer, a server, a router, a network PC, a peer device or other common network node, and typically includes many or all of the elements described above relative to the computer 1310, although only a memory storage device 1381 has been illustrated in FIG. 13. The logical connections depicted in FIG. 13 include a local area network (LAN) 1371 and a wide area network (WAN) 1373, but may also include other networks. Such networking environments are commonplace in offices, enterprise-wide computer networks, intranets and the Internet.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. The modem 1372, which may be internal or external, may be connected to the system bus 1321 via the user input interface 1360, or other appropriate mechanism. In a networked environment, program modules depicted relative to the computer 1310, or portions thereof, may be stored in the remote memory storage device. By way of example, and not limitation, FIG. 13 illustrates remote application programs 1385 as residing on memory device 1381. It will be appreciated that the network connections shown are exemplary and other means of establishing a communications link between the computers may be used.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A process for reflowing digital ink strokes from an original digital document having a first layout in a modified digital document having a second layout that is different from the first layout, comprising:
- grouping the digital ink strokes to define a first digital ink annotation;
- classifying the first digital ink annotation as a callout annotation based on annotation characteristics and contextual information within the original digital document;
- anchoring the first digital ink annotation to a region in the original digital document associated with the first digital ink annotation;
- determining the second layout of the modified digital document;
- processing the first digital ink annotation to conform to the second layout; and
- rendering the first digital ink annotation in the modified digital document such that the first digital ink annotation conforms to the second layout and retains a same meaning and intent in the modified digital document as was present in the original digital document.

2. The process as set forth in claim 1, further comprising classifying a second digital ink annotation as an underline annotation.

3. The process as set forth in claim 2, further comprising anchoring the underline annotation to the characters in the region that are underlined.

4. The process as set forth in claim 1, further comprising classifying a second digital ink annotation as a highlight annotation.

5. The process as set forth in claim 1, further comprising classifying a second digital ink annotation as a marginalia annotation.

6. The process as set forth in claim 5, wherein the marginalia annotation is defined as any digital ink annotation stroke that is in a margin or white space of the digital document.

7. The process as set forth in claim 1, further comprising classifying a second digital ink annotation as a circle annotation.

8. The process as set forth in claim 7, wherein the circle annotation is at least one of: (a) an inline circle; (b) a region circle.

9. The process as set forth in claim 8, wherein the inline circle circumscribes a single line of text.

10. The process as set forth in claim 8, wherein the region circle circumscribes multiple partial line of text and other digital document content.

11. The process as set forth in claim 1, further comprising classifying a second digital ink annotation as a margin bracket annotation.

12. The process as set forth in claim 11, wherein the margin bracket annotation is defined as groups of ink strokes that form approximately vertical lines a margin of the digital document.

13. The process as set forth in claim 1, wherein the callout annotation is defined as an annotation that groups links regions by of the digital document by going from one position to another position.

14. The process as set forth in claim 1, wherein the callout an notation exhibits some curvature.

15. The process as set forth in claim 1, wherein the callout annotation is at an angle to horizontal and to vertical directions in the digital document.

16. The process as set forth in claim 1, wherein ends of the callout annotation are adjacent to at least one of: (a) text of the digital document; (b) content of the digital document; (c) digital ink strokes from other annotations.

* * * * *